United States Patent [19]

Spiess

[11] Patent Number: 5,303,804
[45] Date of Patent: Apr. 19, 1994

[54] SHOCK ABSORBER FOR DAMPING COURSES OF MOTION OF A VEHICLE

[75] Inventor: Ewald Spiess, Vaihingen, Fed. Rep. of Germany

[73] Assignee: Robert Bosch GmbH, Stuttgart, Fed. Rep. of Germany

[21] Appl. No.: 13,983

[22] Filed: Feb. 5, 1993

Related U.S. Application Data

[63] Continuation of Ser. No. 640,509, Jan. 10, 1991, abandoned, which is a continuation of Ser. No. 390,042, Aug. 7, 1992, abandoned.

[30] Foreign Application Priority Data

Oct. 20, 1988 [DE] Fed. Rep. of Germany ....... 3835705

[51] Int. Cl.⁵ ............................................. F16F 9/00
[52] U.S. Cl. .................................. 188/319; 188/299; 188/322.15
[58] Field of Search ........... 188/282, 299, 319, 322.15; 280/714; 251/34, 43; 137/489, 493, 493.8, 493.9

[56] References Cited

U.S. PATENT DOCUMENTS

| | | | |
|---|---|---|---|
| 2,637,414 | 5/1953 | Patriquin | 188/322.15 |
| 3,210,063 | 10/1965 | Kirsch | 137/493.8 |
| 4,016,903 | 4/1977 | Akashi et al. | 137/493.9 X |
| 4,535,877 | 8/1985 | Shimokura | 188/299 X |
| 4,671,392 | 6/1987 | Wossner | 188/299 |
| 4,683,992 | 8/1987 | Watanabe | 188/299 |
| 4,732,408 | 3/1988 | Ohlin | |
| 4,754,855 | 7/1988 | Kuwana et al. | 188/299 |
| 4,802,567 | 2/1989 | Knecht et al. | |
| 4,826,207 | 5/1989 | Yoshioka et al. | 188/319 X |
| 4,854,429 | 8/1989 | Casey | 188/319 X |
| 4,858,736 | 8/1989 | Arnaud et al. | 137/493.8 X |
| 4,880,086 | 11/1989 | Knecht et al. | 188/299 |
| 4,923,038 | 5/1990 | Lizell | 188/299 |
| 4,936,423 | 6/1990 | Karnopp | 188/299 |
| 4,974,707 | 12/1990 | Neumann et al. | 280/714 X |
| 4,986,392 | 1/1991 | Komassa | 188/319 X |

FOREIGN PATENT DOCUMENTS

| | | |
|---|---|---|
| 3609862 | 10/1987 | Fed. Rep. of Germany . |
| 3704712 | 8/1988 | Fed. Rep. of Germany ...... 188/319 |
| 1095506 | 6/1955 | France . |
| WO85/04698 | 10/1985 | PCT Int'l Appl. . |

*Primary Examiner*—Mark T. Le
*Attorney, Agent, or Firm*—Edwin E. Greigg; Ronald E. Greigg

[57] ABSTRACT

A shock absorber including an electromagnetically actuatable control piston located in a damper piston within a cylinder. The damping force is determined directly with the triggering of the magnet coil, regardless of the relative speed between the piston and the cylinder. To control the forces, a first single valve is electrically acted upon, and that valve in turn acts upon a second single valve. The apparatus is used for damping relative motions of two masses, in particular with resilient wheel suspension systems in motor vehicles.

35 Claims, 3 Drawing Sheets

SHOCK ABSORBER FOR DAMPING COURSES OF MOTION OF A VEHICLE

This is a continuation of copending application Ser. No. 07/640,509 filed Jan. 10, 1991, now abandoned, which is a continuation of Ser. No. 07/390,042 filed Aug. 7, 1989, now abandoned.

BACKGROUND OF THE INVENTION

The invention relates to a shock absorber for damping courses of motion of a vehicle as defined herein. A shock absorber has been set forth by which the damping force is variable by means of an electromagnetic valve assembly. The valve assembly is disposed on the damper piston. It includes a magnet coil, an armature and a control slide connected to the armature; the position of the control slide determines the throttling of the pressure fluid flowing back and forth between the two work chambers.

Relative major forces are necessary to actuate the control slide. These forces have to be generated by the magnet coil. This means that a large, heavy, unfavorably expensive magnet coil must be provided. Because of the major forces, short switching times, which are often desired and necessary, are presumably not always attainable.

In the heretofore set forth device the force of the magnet coil determines the position of the control slide, and this position in turn determines a size of throttle cross section. In a shock absorber with a variable throttle cross section, however, what is primarily sought is not so much to control the size of the throttle cross section, but rather to control the damping force and hence the damping of courses of motion, which is directly dependent on a differential pressure between the two work chambers. If the throttle cross section is controlled, then the damping force is dependent not only on the throttle cross section but also on a relative speed between the damper piston and the cylinder, and on the viscosity of the pressure fluid, for example, among other factors. The viscosity can fluctuate relatively markedly, for instance as a function of temperature.

The valve assembly in the known structure is disposed on the damper piston. Other shock absorbers are known, however, in which a valve assembly is provided outside the cylinder.

OBJECT AND SUMMARY OF THE INVENTION

The shock absorber as defined by the body of the main claim has the advantage over the prior art of small size and high adjusting speed. The magnet forces to be generated by the magnet coil are relatively slight.

It is an advantage that only the first sub-flow of the total flow of pressure fluid flows through the first single valve. It is therefore possible for the first single valve to be smaller, and specifically smaller than if the entire flow were to flow through the first single valve. In particular, the forces to be generated by the magnet coil are likewise advantageously smaller.

The force generated by the magnet coil advantageously controls the pressure in the pressure chamber of the second single valve. The differential pressure between the two work chambers, and hence the damping force, is dependent on the pressure in the pressure chamber of the second single valve. As a result it is not the size of a throttling cross section, but advantageously the damping force directly that is determined by triggering the magnet valve. The damping force is thus, as desired, largely independent of a relative speed between the piston and the cylinder, for example, and is also at least predominantly independent on the viscosity of the pressure fluid.

It is particularly advantageous that only the first sub-flow needs to be rectified; and hence only that first sub-flow has to flow through the check valves, so that these check valves can be made relatively small.

Another advantage is that the ratio of the first sub-flow to the second sub-flow is virtually arbitrarily selectable within wide limits, in particular by installing flow baffles and dimensioning them accordingly.

Another advantage is that the damping force is proportional to a force of the magnet coil. If the magnet coil is a proportional magnet, then the damping force is advantageously directly proportional to an electric current for triggering the magnet coil.

Another advantage is that a relatively rapid adjustment of the damping force is attainable with a relatively small magnetic force.

Still another advantage is that with a relatively small magnetic force, a relatively large damping force can be generated; even if a relatively large flow of pressure fluid must be controlled at the same time, nevertheless the necessary magnetic force is relatively slight. For a relatively wide damping force adjusting range, only a narrow magnetic force adjusting range is necessary.

The aforementioned advantages are particularly apparent if the valve assembly is constructed in such a way that the first sub-flow is markedly smaller than the second sub-flow.

The invention will be better understood and further objects and advantages thereof will become more apparent from the ensuing detailed description of preferred embodiments taken in conjunction with the drawings.

DESCRIPTION OF THE PREFERRED EMBODIMENTS

Figure 1:
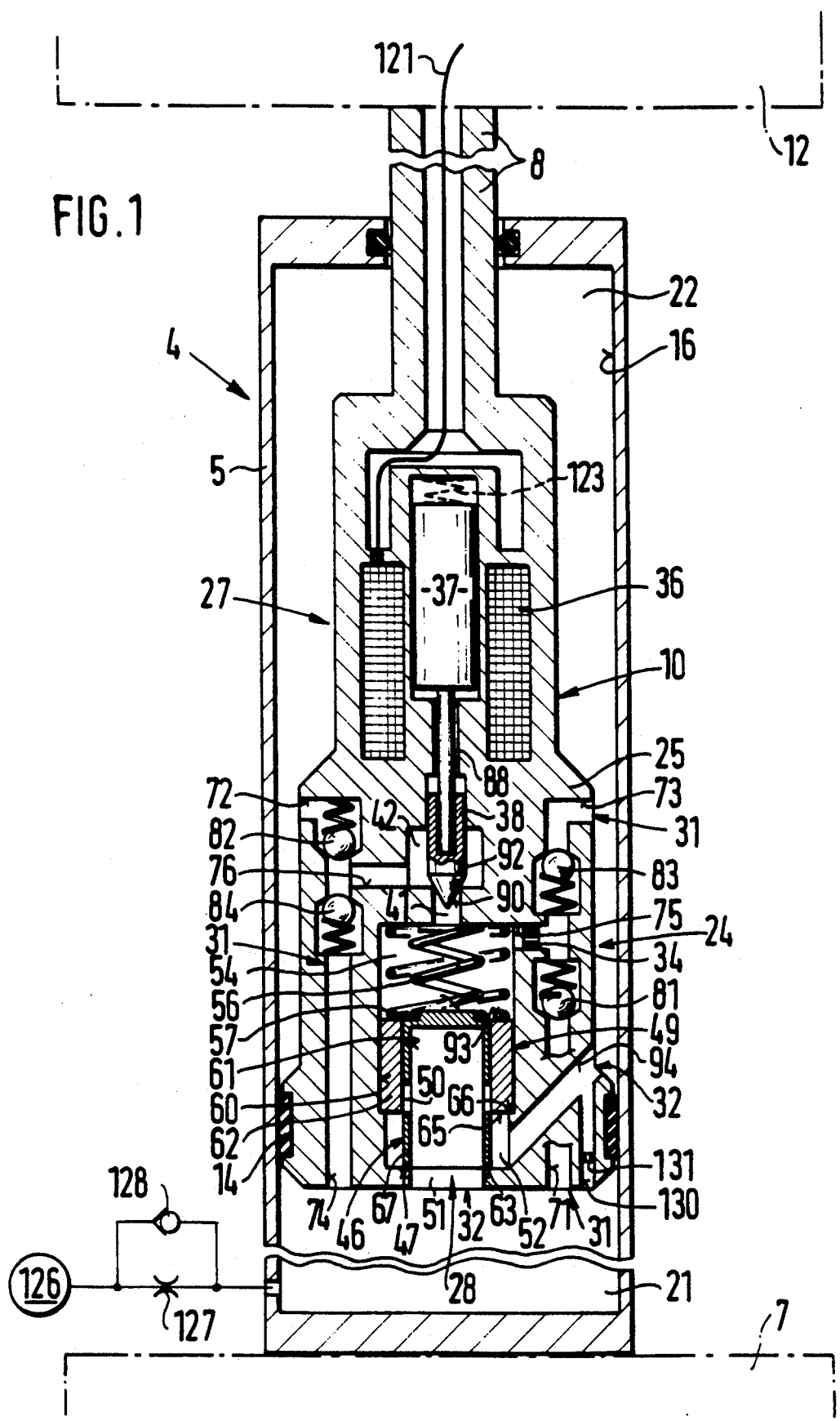
FIGS. 1, 2 and 3 each of which provides simplified illustrations of an exemplary embodiment of a shock absorber according to the invention.

In the exemplary embodiment shown in FIG. 1, the shock absorber has a cylinder 4 having a single cylindrical jacket tube 5, shown in segments, with two face ends. One face end is secured to a vehicle axle 7, represented by dot-dash lines; a piston rod 8 protrudes from the other face end of the jacket tube 5. Only the two ends of the piston rod 8 are shown. The piston rod 8 is connected at one end to a stepped, cylindrical damper piston 10, and at its other end is pivotably connected to a vehicle body 12, again represented by dot-dash lines. Via an interposed guide ring 14, the damper piston 10 can slide axially along an inside jacket face 16 of the jacket tube 5. The guide ring 14 functions as a seal at the same time.

An interior chamber of the jacket tube 5 is subdivided by the damper piston 10 into a first work chamber 21 and a second work chamber 22. In the drawing, the first work chamber 21 is located below the damper piston 10 and the second work chamber 22 is located above the damper piston 10.

Figure 3:
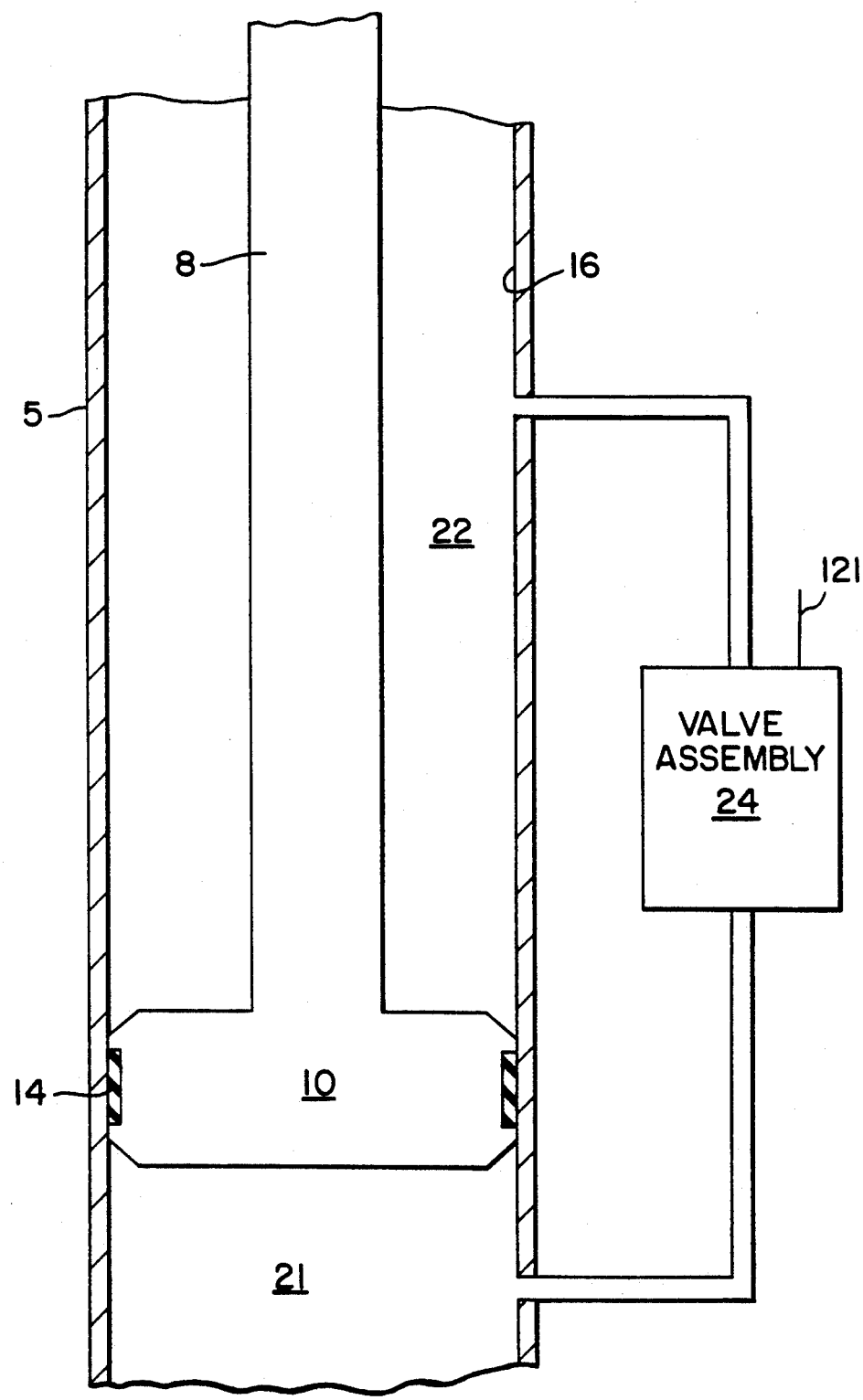

A triggerable electromagnetic valve assembly 24 is integrated into the damper piston 10. The valve assembly 24 determines a damping force of the shock absorber. FIG. 3 illustrates the valve assembly 24 connected to the lower and upper work chambers 21 and 22 via connecting pipes. The valve assembly is shown as a separate valve assembly secured to the outside face of the cylinder 5.

The valve assembly 24 substantially comprises a housing 25 having a first single valve 27, a second single valve 28, a first flow connection 31, a second flow connection 32, and a restriction 34, for instance a flow baffle. Both flow connections 31, 32 connect the two work chambers 21, 22. The first flow connection 31 leads substantially through the first single valve 27, and the second flow connection 32 leads through the second single valve 28. A flow of pressure fluid exchanged between the two work chambers 21, 22 is subdivided into two sub-flowpaths. The first sub-flowpath flows through the first flow connection 31, and the second sub-flowpath flows through the second flow connection 32.

The first single valve 27 is confined within the piston and substantially comprises a magnet coil 36, an armature 37, a control piston 38 connected to or resting on the armature 37, a first pressure connection 41 which also forms a valve seat 92 for the control piston, and a second pressure connection 42 which surrounds the piston 38.

The second single valve 28 substantially includes an inner piston 46, a valve seat 47 provided on the housing 25, an outer piston 49, a valve opening 50 or a plurality of valve openings 50, a first pressure chamber 51, a second pressure chamber 52 coaxial with the first pressure chamber 51, a pressure space 54 axially above piston 49, an inner spring 56 and an outer spring 57. The inner and outer springs 56 and 57 are provided in the pressure space 54. The outer piston 49 is displaceably disposed in a bore 60 of the housing 24. It has a tubular shape, with a wall 62 and a longitudinal axial bore 61 in which the inner piston 46 is displaceably guided. The inner spring 56 acts upon the inner piston 46; a face end 63 of the inner piston 46 oriented toward the valve seat 47 is pressed toward the valve seat 47 by this action of the inner spring 56 upon the inner piston 46. The outer spring 57 presses upon the outer piston 49 in the axial direction, urging one end face 65 of the wall 62 of the outer piston 49 to press against a step or shoulder 66 of the bore 60. The valve openings 50 are provided in a wall 67 of the inner piston 46. Communication between the pressure chambers 51 and 52 can exist not only through the valve openings 50, but also, depending on the position of the inner piston 46, between the wall 67 along the end face 63 of the inner piston 46 and the valve seat 47. The communication through the valve openings 50 is opened to a variable extent depending on the position of the outer piston 49 relative to the inner piston 46.

The first flow connection 31 leads through the two pressure connections 41 and 42 of the first single valve and subdivides substantially into four conduits 71, 72, 73, 74. The first conduit 71 leads out of the first work chamber 21 to the flow baffle 34. In the first conduit 71, between the first work chamber 21 and the flow baffle 34, a first one-way check valve 81 is provided. This first check valve 81 is disposed in such a way that the pressure fluid can flow only out of the first work chamber 21 toward the flow baffle 34, but not in the opposite direction. From the flow baffle 34, an intermediate conduit 75 of the first flow connection 31 leads into the pressure space 54. The pressure space 54 is operatively connected to the first pressure connection 41 of the first single valve 27. Depending on the position of the control piston 38, a variably wide connection exists between the first pressure connection 41 and the second pressure connection 42. From the second pressure connection 42, the second conduit 72 of the first flow connection 31 leads into the second work chamber 22. Between the second pressure connection 42 and the second work chamber 22, a second one-way check valve 82 is disposed in the second conduit 72. This second check valve 82 is installed in such a way that the pressure fluid can flow out of the second pressure connection 42 into the second work chamber 22, but in the reverse direction the way is blocked for the pressure fluid. The third conduit 73 leads from the second work chamber 22 to the flow baffle 34. In the third conduit 73, a third one-way check valve 83 is installed between the second work chamber 22 and the flow baffle 34. This check valve 83 is provided such that the pressure fluid can flow out of the second work chamber 22 in the direction of the flow baffle 34, but the way in the opposite direction is blocked. In the exemplary embodiment, the conduits 71 and 73 join again between the check valves 81 and 83 and then lead together to the flow baffle 34 and through the intermediate conduit 75 into the pressure space 54. From the second pressure connection 42, a fourth conduit 74 leads into the first work chamber 21. In the fourth conduit 74, a fourth one-way check valve 84 is provided, which allows the pressure fluid to flow only out of the second pressure connection 42 through the fourth conduit 74 into the first work chamber 21. Upstream of the two check valves 82, 84, the two conduits 72, 74 are at least partly joined to make a common conduit 76 through which they communicate with the second pressure connection 42.

The control piston 38 is more or less firmly connected to the armature 37. The armature 37 and the control piston 38 are axially displaceably supported in the housing 25. There is at least one annular gap 88 between the housing 25 and the armature 37 or control piston 38. A pressure in the first pressure connection 41 can act upon an end 90 of the control piston 38. On the other end, the control piston 38 is surrounded at least partly by a pressure prevailing in the second pressure connection 42. Because of the gap 88, the pressure in the second pressure connection 42 can act on all sides, except the end 90, of the unit comprising the armature 37 and control piston 38. A magnetic force of the magnet coil 36 presses the armature 37 and hence the control piston 38 counter to the pressure in the first pressure connection 41 toward the valve seat 92 provided on the housing 25. In the exemplary embodiment, the control piston 38 is provided with a conical tip in the vicinity of the end 90, such that part of the conical tip can protrude into the vicinity of the pressure connection 41, so that the valve seat 92 can be sealed in the vicinity of the conical tip. The end 90 is equivalent to a hydraulically operative surface for generating a force in the opening direction. The larger the magnetic force, the more forcefully the control piston 38 is pressed toward the valve seat 92. Depending on the position of the control piston 38 relative to the valve seat 92, the connection between the first pressure connection 41 and the second pressure connection 42 is opened to a variably wide extent.

In the event of a pressure difference between a pressure in the first work chamber 21 and a pressure in the second work chamber 22, the pressure medium seeks to flow through the damper piston 10 having the valve assembly 24 from one work chamber 21, 22 into the other. The pressure difference may for instance arise from a relative motion between the damper piston 10 and the cylinder 4.

If the pressure in the first work chamber 21 is greater than in the second work chamber 22, then the pressure medium seeks to flow through the first conduit 71, via the first check valve 81 and through the flow baffle 34 to reach the first pressure connection 41. As a result, a pressure prevails in the first pressure connection 41 that presses against the end 90 of the control piston 38. If the resultant force is greater than the sum of the magnetic force plus a force brought about by a pressure in the second pressure connection 42, then the control piston 38 lifts from the valve seat 92, and the pressure fluid can flow via the first pressure connection 41 into the second pressure connection 42; from there, it flows through the common conduit 76, the second conduit 72 and via the second check valve 82 into the second work chamber 22. If the pressure in the second work chamber 22 is greater than in the first work chamber 21, then the pressure fluid seeks to flow through the third conduit 73 via the third check valve 83 and through the flow baffle 34 to the first pressure connection 41. In this case as well, the pressure in the first pressure connection 41 generates a force directed counter to the magnetic force, which seeks to lift the control piston 38 from the valve seat 92. If that force is greater than the magnetic force plus a force resulting from a pressure in the second pressure connection 42, the pressure fluid can flow out of the first pressure connection 41 into the second pressure connection 42, and from there through the fourth conduit 74 and via the fourth check valve 84 into the first work chamber 21.

Regardless of whether the pressure in the first work chamber 21 is higher than the pressure in the second work chamber 22, or whether the pressure in the second work chamber 22 is higher than in the first work chamber 21, and regardless of whether the pressure medium flows out of the first work chamber 21 through the first conduit 71 and the second conduit 72 into the second work chamber 22, or from the second work chamber 22 through the third conduit 73 and fourth conduit 74 into the first work chamber, in either case it flows in the vicinity of the first single valve 27 from the first pressure connection 41 past the control piston 38 and valve seat 92 into the second pressure connection 42. This is effected by the check valves 81, 82, 83, 84. These four check valves accordingly serve to rectify the flow of the pressure fluid in the vicinity of the first single valve 27.

The first pressure connection 41 communicates with the pressure space 54. Thus the same pressure always prevails in the pressure space 54 as in the first pressure connection 41. The pressure in the pressure space 54 acts not only on the inner piston 46 in the axial direction, seeking to press this piston 46 with its end face 63 against the valve seat 47, but also on the wall 62, or in other words on an end face 93, on the opposite end from the face end 65, of the outer piston 49 in the axial direction, and seeks to press the end 65 of the outer piston 49 against the step 66.

The second flow connection 32 connects the two work chambers 21, 22 via the second single valve 28 and is subdivided into a plurality of segments. Beginning at the first work chamber 21, the first pressure chamber 51 comes first, followed by the second pressure chamber 52, and then a connecting conduit 94 leads into the second work chamber 22. A plurality of connecting conduits 94 functioning in parallel may also be provided between the second pressure chamber 52 and the second work chamber 22. The first pressure chamber 51 thus communicates with the first work chamber 21. Thus, a pressure in the first work chamber 21 acts upon the inner piston 46 in the axial direction, seeking to lift this inner piston 46 from the valve seat 47. The force of the pressure in the first work chamber 21 is in the opposite direction from the force of the spring 56 and the force of the pressure in the pressure space 54. Because of the connecting conduit 94, virtually the same pressure always prevails in the second pressure chamber 52 as in the second work chamber 22. The pressure in the second pressure chamber 52 acts upon the face end 65 of the outer piston 49 in the axial direction, seeking to lift the outer piston 49 from the step 66. The force of the pressure in the second pressure chamber 52 upon the outer piston is contrary to the force of the outer spring 57 and the force of the pressure in the pressure space 54 upon the end face 93 of the outer piston 49.

To enable a flow of the pressure fluid out of the first work chamber 21 into the second work chamber 22 through the second flow connection 32 via the second single valve 28, the force of the pressure in the first pressure chamber 51 must be at least as great as the force of the pressure in the pressure space 54 upon the inner piston 46, plus the force of the inner spring 56. To enable the pressure fluid to flow out of the second work chamber 22 into the first work chamber 21 through the second flow connection 32 and hence through the connecting conduit 94 through the second pressure connection 52, the second single valve 28, the valve opening 50 and the first pressure connection 51, the force of the pressure in the second pressure chamber 52 upon the end 65 of the outer piston 49 must be at least equal to the force of the pressure upon the end face 93 of the outer piston 49 in the pressure space 54, plus the force of the outer spring 57. For more precise calculations, the forces of friction between the two pistons 46, 49 or between the piston 49 and the bore 60, as well as the forces of inertia and hydraulic forces must naturally also be taken into account, in a manner well known to one skilled in the art.

Figure 2:
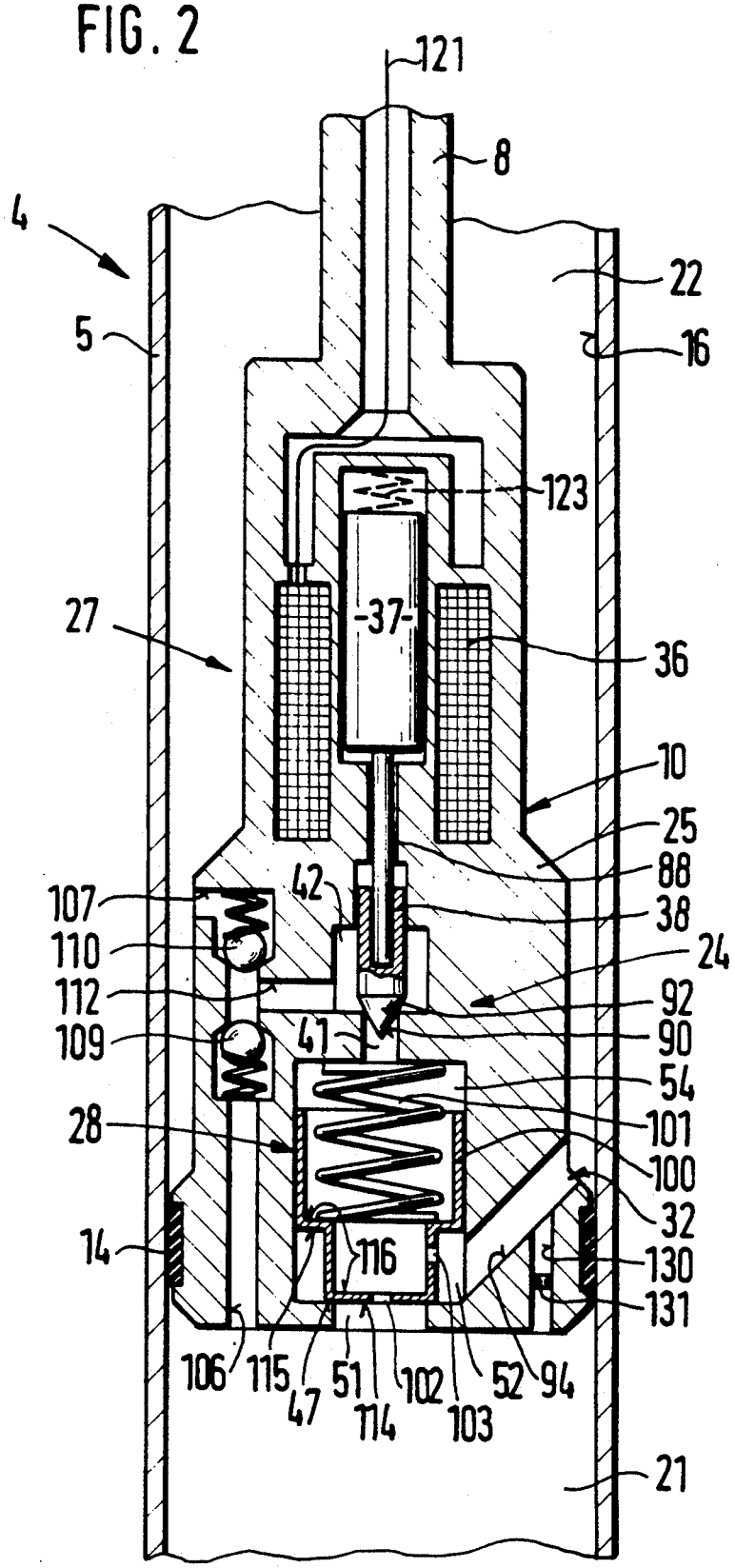

FIG. 2 shows a second exemplary embodiment. In FIGS. 1 and 2, elements that are the same or function the same have the same reference numerals. The shock absorber of the second exemplary embodiment comprises substantially the same elements as that of the first exemplary embodiment. In the first exemplary embodiment (FIG. 1), the second single valve 28 has two pistons 46, 49 and two springs 56, 57 in the pressure space 54. In the second exemplary embodiment (FIG. 2), the second single valve 28 instead includes only one stepped piston 100, and one spring 101 in the pressure space 54. Two restrictions, for instance two flow baffles 102 and 103, are provided in the stepped piston 100. The flow baffle 102 connects the first pressure chamber 51 with the pressure space 54, and the second flow baffle 103 connects the second pressure chamber 52 with the pressure space 54. The flow baffles 102 and 103 have a relatively small bare diameter. Instead of the four conduits 71, 72, 73, 74 of the valve assembly 24 of the first exemplary embodiment (FIG. 1), the valve assembly 24 of the second exemplary embodiment (FIG. 2) includes a first conduit 106 and a second conduit 107. The first conduit 106 connects the second pressure connection 42 of the first single valve 27 with the first work chamber 21. The second conduit 107 connects the second pressure connection 42 with the second work chamber 22. A first one-way check valve 109 is provided in the first conduit 106. A second check valve 110 is located in the second conduit 107. The first one-way check valve 109 is disposed in the first conduit 106 such that depending on the pressure difference, the pressure fluid can flow out of the second pressure connection 42 into the first work chamber 21, but a flow in the opposite direction is not possible. The second check valve 110 is installed in the second conduit 107 in such a way that depending on the pressure difference, the pressure fluid can flow out of the second pressure connection 42 into the second work chamber 22, but a flow in the reverse direction is impossible because of the check valve 110. Upstream of the two check valves 109, 110, the two conduits 106, 107 are at least partly joined into a common conduit 112 for the sake of simplicity, and communicate with the second pressure connection 42.

The second single valve 28 in the second exemplary embodiment (FIG. 2) again has the valve seat 47, but the step 66 of the first exemplary embodiment (FIG. 1) is unnecessary in the second single valve 28 of the second exemplary embodiment (FIG. 2). The stepped piston 100 has a piston face 114 oriented toward the first pressure chamber 51, an annular face 115 oriented toward the second pressure chamber 52, and a piston face 116 oriented toward the pressure space 54. The piston face 114 is approximately identical to an area enclosed by the valve seat 47. The piston face 116 is identical to the maximum cross-sectional piston area. The annular face 115 is approximately equivalent to the piston face 116 minus the piston face 114.

In the second exemplary embodiment of FIG. 2, the area of the piston face 114 has been selected to be half as large as the area of the piston face 116 which includes the face areas opposite faces 114 and 115. Thus the area of the annular face 115 is the same size in area as the piston face 114. The flow baffle 102 was selected to be the same size as the flow baffle 103. If there is a pressure difference between the first work chamber 21 and the second work chamber 22, for instance because the pressure in the first work chamber 21 is higher than the pressure in the second work chamber 22, then a certain portion of the pressure fluid can flow out of the first work chamber 21 into the second work chamber 22, through the first pressure chamber 51, the flow baffle 102, the flow baffle 103, the second pressure chamber 52, and finally the connecting conduit 94. A certain pressure drop takes place at the two flow baffles 102 and 103. Since the two flow baffles 102, 103 have the same diameter, the pressure drop is the same magnitude at both flow baffles, and the pressure in the pressure space 54, when the first single valve 27 is closed, is precisely equal to the pressure in the first work chamber 21, minus one-half the differential pressure between the two work chambers 21, 22. Since the piston face 116 is the same size in area as the piston face 114 and annular face 115 together, the stepped piston 100 is approximately pressure-balanced when the first single valve 27 is closed, and is accordingly pressed against the valve seat essentially only by the spring 101. This means that with the first single valve 27 closed, the second single valve 28 is closed as well. The same is true in the case where the pressure in the second work chamber 22 is higher than that in the first work chamber 21.

The first single valve 27 of the second exemplary embodiment (FIG. 2) is identical to the first single valve 27 of the first exemplary embodiment (FIG. 1). If the first single valve 27 is opened somewhat, then some of the pressure fluid in the pressure space 54 can flow through the first pressure connection 41 past the end 90 of the control piston 38 into the second pressure connection 42, and from there, depending on the pressure difference, through one of the two conduits 106 or 107 to reach one of the two work chambers 21 or 22 depending on the pressure difference. The pressure in the pressure space 54 can be adjusted by means of the first single valve 27, and reduced as needed. The pressure in the pressure space 54, which acts upon the piston face 116, and the force of the spring 101 both seek to press the stepped piston 100 toward the valve seat 47. The pressures in the first pressure chamber 51 and second pressure chamber 52 contrarily seek to displace the stepped piston 100 in the opposite direction, that is, away from the valve seat 47. Thus by lowering the pressure in the pressure space 54, a variably pronounced lifting of the stepped piston 100 from the valve seat 47 can be effected; that is, by lowering the pressure in the pressure space 54, the second single valve 28 can be opened to a variable extent. With the opening of the second single valve 28, the second flow connection 32 between the two work chambers 21, 22 is opened to a variable extent as well. As described above, the magnetic force of the magnet coil 36 determines the pressure in the pressure space 54. The pressure in the pressure space 54 determines the opening of the second flow connection 32. Thus by means of the magnetic force, both the size of the second flow connection 32 and hence the damping force of the shock absorber can be determined.

The shock absorber according to the invention offers the following advantages, among others: In the shock absorber (FIGS. 1 and 2) having the valve assembly 24, it can be attained with suitable dimensioning that only a relatively small portion, or in other words a small sub-flow, of the pressure fluid exchanged between the two work chambers 21 and 22 flows through the first flow connection 31, and that the much larger portion of the pressure medium, that is, a second sub-flow, is exchanged through the second flow connection 32. Relatively small cross-sectional areas can therefore be selected for the conduits 71, 72, 73, 74, 75, 76, 106, 107 and 112. The one-way check valves 81, 82, 83, 84, 109 and 110 and the two pressure connections 41 and 42 can also be embodied with relatively small dimensions. This makes it possible to select a relatively small control piston 38 with a small armature 37, which is actuated by a relatively small magnet coil 36. Since only a relatively small portion, i.e. the first sub-flow of the flow of pressure fluid flows through the first single valve 27, the control piston 38 needs to execute only a relatively short total stroke. Because only relatively small forces are required for actuating the control piston 38, and because the total stroke is short, it is relatively easy to actuate the control piston 38 with a relatively fast reaction. The size of the first sub-flow of pressure fluid flowing through the first flow connection 31 and thus through the first single valve 27 is substantially dependent on the size of the flow baffle 34 (FIG. 1) or flow baffles 102, 103 (FIG. 2). The flow baffles 34, 102, 103 can be selected to be rather small, although they should not be selected to be so small that dirt particles that might be present in the pressure fluid could be trapped in the flow baffles 34, 102, 103.

In the exemplary embodiments shown (FIGS. 1 and 2), the pressure in the pressure space 54 increases with increasing magnetic force. If the magnet coil 36 is a proportional magnet, the pressure in the pressure space 54 and hence the damping force is directly proportional to a trigger current that is supplied to the magnet coil 36 through an electrical line 121.

The first single valve 27 may also be embodied in such a way, however, that the force of a spring 123, shown only in dashed lines in the drawing, acts in the closing direction upon the armature 37 and thus upon the control piston 38. If this spring 123 is a relatively strong spring, then in that case the magnetic force must be capable of acting in the direction of opening of the first single valve 37; that is, the magnet coil 36 and the armature 37 must be designed accordingly. In this version, if there should be a malfunction, for instance if the electrical power fails, the spring 123 will press the control piston 38 against the valve seat 92, and in a power failure, for example, the maximum possible damping force will be obtained. In a version without the spring 123, or with a spring 123 that only relatively weakly reinforces the magnetic force, the minimum possible damping force will then be obtained if the power fails, for instance. Depending on the intended application, one version may be favored over the other.

When the piston rod 8 is retracted into the cylinder 4, some of the pressure fluid is positively displaced out of the cylinder 4, depending on the piston rod cross section. When the piston rod 8 is projected out of the cylinder 4, it should be possible for the pressure fluid to flow into the cylinder 4. To this end, the first work chamber 21 for instance communicates with a reservoir 126. To enable generating sufficiently high pressure in the first work chamber 21 and thus a relatively strong damping force, even with a relatively low pressure in the reservoir 126, a throttle 127 has been installed between the reservoir 126 and the work chamber 21. In the return flow of the pressure fluid out of the reservoir 126 into the work chamber 21, the throttle 127 is unnecessary; therefore, a one-way check valve 128 has been disposed parallel to this throttle 127. The check valve 128 is built in in such a way that the pressure medium can flow through the check valve 128 only when the direction of flow is from the reservoir 126 into the work chamber 21.

To assure that the volume of pressure fluid positively displaced into one of the work chambers 21, 22 is equal to the volume flowing into the other of the work chambers when there is relative motion between the damper piston 10 and the jacket face 5, a double piston rod can be used, which on either end of the damper piston 10 protrudes from the jacket face 5. It is particularly favorable for both ends of the double piston rod to have approximately the same diameter.

Two single-tube shock absorbers have been chosen as exemplary embodiments (FIGS. 1 and 2) for the shock absorber according to the invention. This is merely an example, however. The shock absorber could equally well be a so-called twin-tube shock absorber.

Several known versions are possible for the check valves 81, 82, 83, 84, 109, 110. In FIGS. 1 and 2, the check valves for example each comprise one spring and one ball, with the ball being pressed by the spring against a corresponding step of the conduit in which the check valve is installed.

In the second exemplary embodiment of FIG. 2, because of the flow baffles 102 and 103 connected in series, the differential pressure between the first pressure connection 41 and the second pressure connection 42 is always smaller than the differential pressure between the first work chamber 21 or the first pressure chamber 51 and the second work chamber 22 or second pressure chamber 42 of the second single valve 28. This requires less magnetic force, with the same operative cross section of the end 90 of the control piston 38, than that in the first exemplary embodiment of FIG. 1, because in this first exemplary embodiment the differential pressure between the first pressure connection 41 and the second pressure connection 42 of the first single valve 27 may be just the same magnitude as the differential pressure between the first pressure chamber 51 and the second pressure chamber 52 of the second single valve 28, and thus, the same magnitude as a maximum expected differential pressure between the two work chambers 21 and 22. If all other conditions are equal, the pressure in the pressure space 54 of the first exemplary embodiment (FIG. 1) is greater than the pressure in the pressure space 54 of the second exemplary embodiment (FIG. 2). If one of the two pistons 46, 49 in the first exemplary embodiment is to be raised by the same amount as the stepped piston 100 in the second exemplary embodiment, then a smaller quantity of pressure fluid has to be positively displaced in the pressure space 54 of the first exemplary embodiment than from the pressure space 54 of the second exemplary embodiment. This has the advantage that the valve assembly 24 of the first exemplary embodiment can react generally faster than the valve assembly 24 of the second exemplary embodiment. As noted above, under otherwise identical conditions the differential pressure at the first single valve 27 of the first exemplary embodiment (FIG. 1) is greater than the differential pressure at the first single valve 27 of the second exemplary embodiment (FIG. 2). Since greater differential pressures can be controlled relatively more precisely, the overall result is that the damping force in the first exemplary embodiment can be adjusted generally more precisely than in the second exemplary embodiment.

As noted above, the damping force of the shock absorber is substantially dependent on the pressure in the pressure space 54 of the second single valve 28. This pressure is regulated, as also explained above, with the aid of the electric current supplied to the magnet coil 36. Thus the damping force is largely independent of the quantity and viscosity of the pressure fluid that is intended to be exchanged between the two work chambers 21, 22; that is, it is largely independent of a temperature of the pressure fluid and of the speed with which the damper piston 10 moves relative to the jacket tube 5; in still other words, the damping force is largely independent of whether the vehicle axle 7 is moving fast or slowly relative to the vehicle body 12.

The valve assembly 24 may be provided inside the damper piston 10, as shown in the drawings, FIGS. 1 and 2, of the exemplary embodiments. However, it may also be disposed for instance on an outside face of the jacket tube 5, FIG. 3, or in or on some other dividing piston inside the cylinder.

In the first exemplary embodiment (FIG. 1), the hydraulically operative cross-sectional area of the inner piston 46 may be equal to, larger, or smaller than the hydraulically operative cross-sectional area of the wall 62 of the outer piston 49. Similarly, the force of the inner spring 56 need not be equal to the force of the outer spring 57.

In the second exemplary embodiment (FIG. 2), the piston face 114 need not be the same size as the annular face 115, and the flow baffle 102 need not be the same size as the flow baffle 103. Depending on the design of these parts, for instance, the properties of the shock absorber can advantageously be arbitrarily embodied within wide limits. For instance, the shock absorber can be designed such that, on the condition of identical triggering of the magnet coil 36, the damping force in one direction of motion either is or is not equal to the damping force in the other.

The attainable damping force is determined by the adjustable magnetic force, because whenever the compression force on the end 90 of the control piston 38 is greater than the magnetic force, the first single valve 27 opens, so that the pressure in the pressure space 54 cannot increase further; as a result, the second single valve 28 can likewise open just wide enough that the damping force has precisely the desired value, largely independently of the relative speed between the jacket tube 5 and the damper piston 10, for example, but also independently of the viscosity of the pressure fluid. The maximum damping force is determined by the maximum generatable magnetic force and can never be exceeded, even in the worst case.

In the case where the spring 123 acting in the closing direction is provided, and the magnetic force acts in the opening direction, the maximum damping force is determined by the force of the spring 123.

In the housing 25, the work chambers 21, 22 may communicate optionally via further recesses 130, optionally having flow baffles 131, to generate a certain basic damping force. However, mostly likely, because of the versatility of the valve assembly 24, these recesses will be unnecessary.

By the selection particularly of the size of the end 90 of the control piston 38, the flow baffle 34, the face end 65 of the outer piston 49 and the cross-sectional area of the inner piston 46, or of the flow baffles 102, 103, the piston faces 114, 116 and the annular face 115, the ratio of the magnetic force to be generated to the damping force, at a given flow of pressure fluid supplied, can advantageously be determined virtually arbitrarily within wide limits.

The foregoing relates to preferred exemplary embodiments of the invention, it being understood that other variants and embodiments thereof are possible within the spirit and scope of the invention, the latter being defined by the appended claims.

What is claimed and desired to be secured by Letters Patent of the United States is:

1. A shock absorber for damping courses of motion of two masses moving relative to one another at variable speeds, having a cylinder, a damper piston displaceable in said cylinder, said damper piston divides said cylinder into a first and a second work chamber, said cylinder and said damper piston are each connected to a respective one of said masses, at least one valve assembly (24), said at least one valve assembly including a first single valve (27) and a second single valve (28), said first single valve (27) is triggerable by control signals to influence a flow of a pressure fluid out of at least one of said first and second work chambers into the other of said first and second work chambers, wherein the flow of pressure fluid flowing through said first single valve (27) and said second single valve (28) is divided into a first partial flow path (31) and a second partial flow path (32), each of which connects the first and second work chambers to each other, said first single valve (27) is located in and controls fluid flow through said first partial flow path, and the second single valve (28) is located in and controls fluid flow through said second partial flow path (32), said first partial flow path (31) includes at least one one-way check valve (81, 82, 83, 84, 109, 110) disposed in a conduit (71, 72, 73, 74, 106, 107) through which fluid flows via said first single valve (27) such that fluid always flows through said first single valve (27) in only one direction from either of said two work chambers to the other of said two work chambers, said second single valve (28) via said second partial flow path (32) controls fluid flow in reversible directions between said two work chambers, and wherein the control signals control said first single valve (27) and the damping force directly as a function of control signals.

2. A shock absorber as defined by claim 1, in which said second single valve is provided with a pressure space (54), wherein fluid flow in said first partial flow path (31) and a pressure in said pressure space (54) is influenced by said first single valve (27), and fluid flow in said second partial flow path (32) is influenced by the pressure in the pressure space (54) of the second single valve (28).

3. A shock absorber as defined by claim 2, in which said second single valve (28) includes at least one pressure piston (46, 49, 100) defining said pressure space (54), and that the pressure in the pressure space (54) applies a pressure on said at least one pressure piston (46, 49, 100) counter to the direction of a possible pressure piston stroke, and fluid flow through said second partial flow path is influenced by an applicable position of said at least one pressure piston.

4. A shock absorber as defined by claim 3, in which said valve assembly (24) includes at least one fluid flow restriction (34, 102, 103).

5. A shock absorber as defined by claim 3, in which said first single valve (27) includes a control piston (38) actuatable by a magnet coil (36), and said control piston (38) controls fluid flow through the first partial flow path.

6. A shock absorber as defined by claim 2, in which said first single valve (27) includes a control piston (38) actuatable by a magnet coil (36), and said control piston (38) controls fluid flow through the first partial flow path.

7. A shock absorber as defined by claim 6, in which said valve assembly (24) includes at least one fluid flow restriction (34, 102, 103).

8. A shock absorber as defined by claim 6, in which said control piston (38) is influenced in a direction such that said control piston (38) is displaced by a pressure in the pressure space (54) juxtaposed thereto.

9. A shock absorber as defined by claim 2, in which said valve assembly (24) includes at least one fluid flow restriction (34, 102, 103).

10. A shock absorber as defined by claim 1, in which said first partial flow path is smaller than said second partial flow path.

11. A shock absorber as defined by claim 1, in which said valve assembly (24) includes at least one fluid flow restriction (34, 102, 103).

12. A shock absorber as defined by claim 1, in which at least two one-way check valves (81, 82, 83, 84, 109, 110) determine a flow direction of fluid flow in the first partial flow path, said at least two one-way check valves are disposed in a conduit (71, 72, 73, 74, 106, 107)

through which the fluid flow through said first partial flow path flows.

13. A shock absorber as defined by claim 1, in which a throttle cross section is determined as a function of the damping force and the magnitude of the pressure fluid flow.

14. A shock absorber as defined by claim 1, in which said valve assembly (24) is provided on an outside face of said cylinder (5).

15. A shock absorber as defined in claim 1 in which the first single valve (27) includes a control means (38) and a valve seat (92), wherein a direct adjustment of a damping force is effected by an adjusting force which actuates the control means (38) in a closing direction toward the valve seat (92), and a pressure, on an inlet side of the control means (38), of the pressure fluid flowing through the first partial flow path (31) acts upon the control means (38) counter to the adjusting force in the opening direction.

16. A shock absorber as defined in claim 15 in which the second single valve (28) includes at least one valve piston (46, 49, 100), wherein an oncoming-side pressure of the pressure fluid flowing through the second partial flow path (32) acts upon the at least one valve piston (46, 49, 100) in an opening direction, and the oncoming flow-side pressure in a pressure chamber (54) at the control means (38) in the first partial flow path (31) actuates the at least one valve piston (46, 49, 100) in a closing direction.

17. A shock absorber as defined by claim 3, in which one pressure piston of said at least one pressure piston (46, 49, 100) is subjected in a stroke direction to the force of a spring (56, 57, 101).

18. A shock absorber as defined by claim 17, in which said first single valve (27) includes a control piston (38) actuatable by a magnet coil (36), and said control piston (38) controls fluid flow through the first partial flow path.

19. A shock absorber for damping courses of motion of two masses moving relative to one another at variable speeds, having a cylinder, a damper piston displaceable in said cylinder and dividing said cylinder into a first and a second work chamber, wherein the cylinder and the damper piston are each connected to one of the masses, at least one valve arrangement (24), said at least one valve arrangement including a first single valve (27) and a second single valve (28), said first single valve (27) includes a control means (38) and a valve seat (92), said control means (38) is triggerable with control signals and influences a flow of a pressure fluid from one of the two work chambers into the respective other work chamber, wherein the flow of pressure fluid flowing through said first single valve (27) and said second single valve (28) is divided into a first partial flow path (31) and a second partial flow path (32), each of which connects the first and second work chambers to each other, said first single valve (27) is located in and controls fluid flow through said first partial flow path, and the second single valve (28) is located in and controls fluid flow through said second partial flow path (32), said first partial flow path (31) includes at least one one-way check valve (81, 82, 83, 84, 109, 110) disposed in a conduit (71, 72, 73, 74, 106, 107) through which fluid flows via said first single valve (27) such that fluid always flows through said first single valve (27) in only one direction from either of said two work chambers to the other of said two work chambers, said second single valve (28) via said second partial flow path (32) controls fluid flow in reversible directions between said two work chambers, and wherein the control signals control the damping force directly, in that the control means (38) is actuated toward the valve seat (92) as a function of the control signals.

20. A shock absorber as defined in claim 19 wherein a direct adjustment of a damping force is effected by an adjusting force which actuates the control means (38) in a closing direction toward the valve seat (92), and a pressure, on an inlet side of the control means (38), of the pressure fluid flowing through the first partial flow path (31) acts upon the control means (38) counter to the adjusting force in the opening direction.

21. A shock absorber as defined in claim 20 in which the second single valve (28) includes at least one valve piston (46, 49, 100), wherein an oncoming-side pressure of the pressure fluid flowing through the second partial flow path (32) acts upon the at least one valve piston (46, 49, 100) in an opening direction, and the oncoming flow-side pressure in a pressure chamber (54) at the control means (38) in the first partial flow path (31) actuates the at least one valve piston (46, 49, 100) in a closing direction.

22. A shock absorber for damping courses of motion of two masses moving relative to one another at variable speeds, having a cylinder, a damper piston displaceable in said cylinder and dividing said cylinder into a first and a second work chamber, wherein the cylinder and the damper piston are each connected to one of the masses, at least one valve arrangement, said at least one valve arrangement including a first single valve (27) and a second single valve (28), said first single valve (27) is triggerable with control signals and influences a flow of a pressure fluid from one of the two work chambers into the respective other work chamber, wherein the flow of pressure fluid flowing through said first single valve (27) and said second single valve (28) is divided into a first partial flow path (31) and a second partial flow path (32), each of which connects the first and second work chambers to each other, said first single valve (27) is located in and controls fluid flow through said first partial flow path, and the second single valve (28) is located in and controls fluid flow through said second partial flow path (32), said first partial flow path (31) includes at least one one-way check valve (81, 82, 83, 84, 109, 110) disposed in a conduit (71, 72, 73, 74, 106, 107) through which fluid flows via said first single valve (27) such that fluid always flows through said first single valve (27) in only one direction from either of said two work chambers to the other of said two work chambers, said second single valve (28) via said second partial flow path (32) controls fluid flow in reversible directions between said two work chambers, and wherein the control signals control the damping force directly and wherein an infinitely graduated variation of the control signals means an infinitely graduated variation of the damping force.

23. A shock absorber as defined in claim 22 in which the first single valve (27) includes a control means (38) and a valve seat (92), wherein a direct adjustment of a damping force is effected by an adjusting force which actuates the control means (38) in a closing direction toward the valve seat (92), and a pressure, on an inlet side of the control means (38), of the pressure fluid flowing through the first partial flow path (31) acts upon the control means (38) counter to the adjusting force in the opening direction.

24. A shock absorber as defined in claim 23 in which the second single valve (28) includes at least one valve piston (46, 49, 100), wherein an oncoming-side pressure of the pressure fluid flowing through the second partial flow path (32) acts upon the at least one valve piston (46, 49, 100) in an opening direction, and the oncoming flow-side pressure in a pressure chamber (54) at the control means (38) in the first partial flow path (31) actuates the at least one valve piston (46, 49, 100) in a closing direction.

25. A shock absorber for damping courses of motion of two masses moving relative to one another at variable speeds, having a cylinder, a damper piston displaceable in said cylinder and dividing said cylinder into a first and a second work chamber, wherein the cylinder and the damper piston are each connected to one of the masses, at least one valve arrangement, said at least one valve arrangement including a first single valve (27) and a second single valve (28), said first single valve (27) is triggerable with control signals and influences a flow of a pressure fluid from one of the two work chambers into the respective other work chamber, wherein the flow of pressure fluid flowing through said first single valve (27) and said second single valve (28) is divided into a first partial flow path (31) and a second partial flow path (32), each of which connects the first and second work chambers to each other, said first single valve (27) is located in and controls fluid flow through said first partial flow path, and the second single valve (28) is located in and controls fluid flow through said second partial flow path (32), said first partial flow path (31) includes at least one one-way check valve (81, 82, 83, 84, 109, 110) disposed in a conduit (71, 72, 73, 74, 106, 107) through which fluid flows via said first single valve (27) such that fluid always flows through said first single valve (27) in only one direction from either of said two work chambers to the other of said two work chambers, said second single valve (28) via said second partial flow path (32) controls fluid flow in reversible directions between said two work chambers, and wherein said first single control valve includes a control means (38) actuatable toward a valve seat (92) with the aid of the control signals provided in the course of the first partial flow path.

26. A shock absorber as defined by claim 25, in which the control signals control a damper force directly, and a throttle cross section is determined as a function of the damper force and the magnitude of the pressure fluid flow.

27. A shock absorber as defined by claim 26, in which a pressure in a pressure connection (41) provides upstream of the control means (38) is controllable as a function of the actuation of the control means (38) toward the valve seat (92).

28. A shock absorber as defined by claim 25, in which a pressure in a pressure connection (41) provided upstream of the control means (38) is controllable as a function of the actuation of the control means (38) toward the valve seat (92).

29. A shock absorber as defined in claim 25 wherein a direct adjustment of a damping force is effected by an adjusting force which actuates the control means (38) in a closing direction toward the valve seat (92), and a pressure, on an inlet side of the control means (38), of the pressure fluid flowing through the first partial flow path (31) acts upon the control means (38) counter to the adjusting force in the opening direction.

30. A shock absorber as defined in claim 29 in which the second single valve (28) includes at least one valve piston (46, 49, 100), wherein an oncoming-side pressure of the pressure fluid flowing through the second partial flow path (32) acts upon the at least one valve piston (46, 49, 100) in an opening direction, and the oncoming flow-side pressure in a pressure chamber (54) at the control means (38) in the first partial flow path (31) actuates the at least one valve piston (46, 49, 100) in a closing direction.

31. A shock absorber for damping courses of motion of two masses movable relative to one another at variable speeds, having a damper piston that is displaceable in a cylinder and which divides the cylinder into a first and a second work chamber, wherein the cylinder and the damper piston are each connected to one of the masses; at least one valve device which varies a flow of a pressure fluid out of one of the two work chambers into the other work chamber, the valve device being triggerable with control signals and including a first single valve (27) and a second single valve (28), wherein a flow of pressure fluid being exchanged between the two work chambers (21, 22) is divided into a first partial flow flowing through a first partial flow path (31) and variable by means of the first single valve (27) and a second partial flow flowing through a second partial flow path (32) and variable by means of the second single valve (28), wherein the first and second partial flow paths (31, 32) extend at least partly separately, and the first single valve (27) includes a control means (38) that is actuatable as a function of the control signals toward a valve seat (92) and throttles the first partial flow; at least two check valves (81, 82, 83, 84, 109, 110) serving to rectify the flow of the pressure fluid in a region of the first single valve and permitting the flow of the first partial flow from a direction of a first pressure connection (41) located upstream of the valve means (38) in a direction of a second pressure connection (42) located downstream of the control means (38), wherein the second single valve (28) includes at least one valve piston (46, 49, 100) and a pressure chamber (54) that communicates with the first pressure connection (41), wherein the pressure prevailing in the pressure chamber (54) controls the second single valve (28) by action upon the at least one valve piston (46, 49, 100), the pressure in the pressure chamber (54) drives at least one of said at least one valve piston (46, 49, 100) in the closing direction against a valve seat (47); and the second single valve (28) has a flow through it in two opposed flow directions in alternation and in both opposed flow directions the oncoming higher pressure acts in the opening direction upon the at least one valve piston (46, 49, 100).

32. A shock absorber as defined by claim 31 in which said at least one valve piston (46, 49, 100) is subjected in the reciprocating direction to the force of a spring (56, 57, 101).

33. A shock absorber as defined by claims 32 in which the valve means (38) is actuatable by means of a magnet coil (36).

34. A shock absorber as defined by claim 31 in which the valve means (38) is actuatable by means of a magnet coil (36).

35. A shock absorber as defined by claim 2, in which said valve assembly (24) is provided in the damper piston (10).

* * * * *